United States Patent [19]

Greatorex et al.

[11] Patent Number: 4,792,426
[45] Date of Patent: Dec. 20, 1988

[54] PRECISION CONTROL OF THE THICKNESS OF HEAT-SOFTENABLE MATERIAL

[75] Inventors: Anthony T. Greatorex, Syston; Joseph Robbins, Bradgate View; Ernest A. Toon, Wigston Magna; David A. Thompson, Sileby, all of England

[73] Assignee: USM Corporation, Farmington, Conn.

[21] Appl. No.: 119,302

[22] Filed: Nov. 6, 1987

Related U.S. Application Data

[62] Division of Ser. No. 866,646, May 27, 1986, abandoned.

[30] Foreign Application Priority Data

May 28, 1985 [GB] United Kingdom ................. 8513345

[51] Int. Cl.4 ............................................. B29C 43/22
[52] U.S. Cl. ..................................... 264/284; 264/280; 264/348
[58] Field of Search ................ 264/280, 284, 348, 237

[56] References Cited

U.S. PATENT DOCUMENTS

| 3,223,027 | 12/1965 | Soda | 100/93 |
|---|---|---|---|
| 3,852,012 | 12/1974 | Pfeifter | 425/363 |
| 3,907,479 | 9/1975 | Platte et al. | 425/371 |
| 4,216,179 | 8/1980 | Lamberts et al. | 425/335 |
| 4,228,076 | 10/1980 | Pettingell | 264/280 |
| 4,235,834 | 11/1980 | Vetter et al. | 264/280 |
| 4,334,468 | 6/1982 | Guttinger et al. | 425/371 |
| 4,396,566 | 8/1983 | Brinkmann | 264/70 |
| 4,406,719 | 9/1983 | Mitsumoto et al. | 156/583.5 |
| 4,417,866 | 11/1983 | Sitzler | 425/363 |
| 4,474,845 | 10/1984 | Hagerman | 264/280 |

FOREIGN PATENT DOCUMENTS

| 0046526 | 8/1981 | European Pat. Off. | |
| 2922152 | 12/1980 | Fed. Rep. of Germany . | |
| 51-1744 | 1/1976 | Japan | 425/371 |
| 165215 | 10/1982 | Japan | 156/583.5 |
| 2141376 | 12/1984 | United Kingdom . | |
| 2140739 | 12/1984 | United Kingdom . | |

Primary Examiner—James Lowe
Attorney, Agent, or Firm—Thomas S. Szatkowski

[57] ABSTRACT

A process for precisely controlling the thickness of a heat-softenable sheet material (52) comprising heating the material to bring it to a softened condition, compressing the material while in the softened condition to the desired thickness or somewhat less and then cooling the material to a temperature below its softening point so that it sets while precisely maintained at the desired thickness. The material is cooled by passing it between substantially parallel cooling plate (32,34) rigidly spaced with a separation equal to the desired thickness of the material.

10 Claims, 1 Drawing Sheet

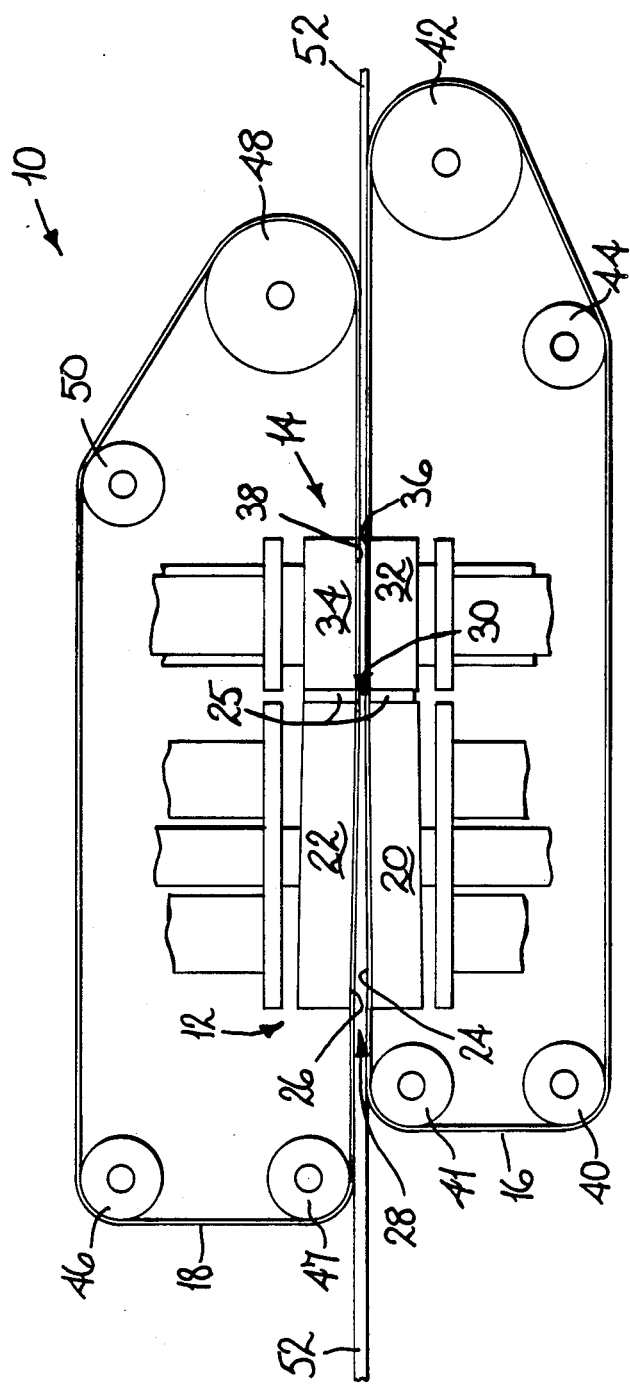

PRECISION CONTROL OF THE THICKNESS OF HEAT-SOFTENABLE MATERIAL

This is a divisional of co-pending application Ser. No. 866,646, filed on May 27, 1986, now abandoned.

TECHNICAL FIELD

This invention relates to a process for the precision control of the gauge or thickness of a heat-softenable sheet material and an apparatus therefor.

Heat-softenable sheet material to which this invention relates comprises material which when heated may be brought to a condition where it is soft and pliable and may also be compressed. The melt characteristics of the material are used to provide the control of thickness, so the material must have a thermoplastic component which allows the material to soften and become pliable on heating and which allows it to be compressed. This type of material mostly comprises non-woven material produced according to conventional non-woven techniques wherein the fibres are formed into a batt and subsequently impregnated with a thermoplastic binder composition. The present invention also applies to other materials including non-woven material comprising heat-fusible thermoplastic fibres and also stitch-bonded fabrics having a thermoplastic component. The present invention, however, is not restricted to non-woven material; it may for example apply to a non-woven material having a woven backing layer such as a woven scrim, or a foam having a thermoplastic component e.g. PVC which may or may not have a woven backing material or to other materials which are heat-softenable and compressible. The term "heat-softenable sheet material" may also apply to woven material, but as the fibres are woven together, a "tighter" product is provided which is less compressible and hence less subject to control of thickness in the manner of the invention.

BACKGROUND ART

Material of the above description, particularly non-woven material currently produced according to conventional non-woven techniques, is generally of a slightly uneven gauge when measurements of thickness are taken across a sample sheet. This is undesirable in many cases, particularly in materials where a precise and even thickness is required, as material not conforming to the desired standard must be discarded. Commonly, in order to provide a certain thickness, the material is heated and pressed to the desired gauge. Material so treated, however, tends to recover slightly after pressing, and as different portions of the sample tend to recover to somewhat different degrees, this leads to a variation in the thickness of the material across the sample. Also, apparatus used in such an operation tends to be very heavy. For example, pairs of solid steel belts are often employed to compress material; the apparatus associated with such belts is required to be large and heavy in order that it might support the weight of the belts.

It is an object of this invention to provide a process for controlling the gauge or thickness of a heat-softenable, sheet material. Such control is intended to provide a product which has a substantially even gauge thickness throughout the sample (low Coefficient of Variation) and also allows the gauge thickness of the final product to be accurately predetermined so that a specific and precise thickness may be set.

BRIEF DISCLOSURE OF THE INVENTION

According to the present invention, a process for precision controlling the thickness of a sheet of heat-softenable material by heating the material to bring it to a softened condition, compressing the material while in the softened condition to the desired thickness and cooling the material below its softening point whilst maintaining the desired thickness, is characterised in that said sheet material is passed continuously through a passage through a heated zone wherein the material passing through is softened, the thickness of the softened material being controlled so that it exits from the heated zone at the desired thickness or at somewhat less to pass through a cooling zone wherein the material passing through is set whilst precisely maintained at the desired thickness.

In a process according to the invention, not only is the variation in the thickness of the heat-softenable material reduced as compared with to material produced according to conventional methods, but also the thickness of the material may be fairly accurately predetermined.

This precise thickness control is achieved by heating the heat-softenable material to a temperature above its softening point, then compressing it whilst it is in a heat-softened condition, and then cooling it to a temperature below its softening point before it recovers from the reduced thickness to which it has been compressed. The final thickness of the material is determined by the depth of the passage through the cooling zone, controlled by the distance between the second pair of plates. If the distance between this second pair of plates is slightly greater than the gauge to which the heat-softened material has been compressed in the heated zone, the material will expand to take up any space between the second pair of plates while it is still soft; it will be set at this thickness as it is cooled to a temperature below its softening point before it leaves the second pair of plates in the cooling zone so that there is substantially no recovery. Such a "step-up" from the heated zone to the cooling zone can pooduce an improved surface finish. In a process according to the invention, therefore, it is important to ensure that the material is cooled below its softening point before it has a chance to recover from its compressed state. In order for this to be achieved, the cooling stage of the process is preferably carried out as soon as possible after the heating stage of the process. The extent to which the heat-softenable material may be compressed largely depends on its density and thermoplasticity. It is important to ensure that in both the heated and cooling zones of the process, the sample reaches the desired optimum temperature throughout its entire thickness. It is also important to ensure that the material has sufficient time in the heated zone to soften enough to ensure that the fibres can accommodate the position in which they are desired to be set in the final product. In addition, the heat-softenable material should preferably not be pressed before it is fully softened throughout its thickness, or else some parts of the material will be pressed to a greater extent than others.

In order to carry out a process according to the invention the material is preferably equally heated on both sides, for example by pairs of opposing heating plates, and may then be passed through a tapering section in which the material is compressed as the passage between the surfaces between which it passes decreases in depth; it then passes before it has a chance to recover into a cooling zone. Preferably the material is cooled on both sides to accelerate the cooling process and to ensure that the sample has been cooled below its softening point throughout its entire thickness. The material, on leaving the cooling zone, is sufficiently cool that there will be substantially no recovery from its compressed state and the thickness of the material will correspond to the predetermined thickness as set in the cooling zone by the separation between the second pair of plates.

Further, in apparatus for carrying out a process according to the invention the sheet material is forwarded by engagement between a pair of endless belts and passed through a passage between a first pair of plates provided with heating means and a second pair of plates provided with cooling means, said first pair of plates being held rigidly with a separation at the parallel exit edges equal to or somewhat less than the thickness desired for the sheet material and said second pair of plates being held rigidly parallel with a separation equal to the desired thickness, whereby in operation said first of plates define a passage through a heated zone wherein the material passing through is softened and said second pair of plates define a passage through a cooling zone wherein the material passing through is set whilst precisely maintained at the desired thickness.

Heat-softenable material which has passed through an apparatus according to the invention has a reduced variation of thickness across the sample as compared with material gauged according to conventional techniques. In apparatus according to the invention, the thickness of a material passed therethrough may be accurately predetermined without the need for prior tests to be carried out on the sample to ascertain the degree of recovery after compression and hence determine the amount of pressing of the main body of the material necessary to provide the desired thickness. In addition, material passed through apparatus according to the invention may be provided with a desired surface appearance.

As stated above, it is preferred that the cooling zone of apparatus according to the invention is located substantially immediately after the heated zone. An insulating section, where the heat-softened material is maintained in its compressed heat-softened state before cooling, may be located between the heated zone and the cooling zone. By "substantially immediately" we mean that where no insulating section is employed the distance between the heating and cooling sections is preferably less than 15 mm.

The material is carried through the heated and cooling zones by means of a belt arrangement comprising preferably a pair of endless belts which are each arranged to move in a closed loop passing through the heated and cooling zones and arranged to cooperate to forward material inserted between the two belts through said heated and cooling zones. The belts should preferably provide good heat transfer through each belt between the respective plates in the heated and cooling zones and the heat-softenable sheet material. This leads to a cheaper and more efficient process as the heat transfer through the belts between the plates and the heat-softenable sheet material is quick and efficient and the temperature transmitted through the belt accurately reflects the temperatures of each of the heated and the cooling zones. This efficient heat transfer is most significant as the belt arrangement passes from the heating section into the cooling section, as it is important for the belts of the belt arrangement, when entering the cooling section, to transmit the cooling effect of the cooling plates quickly and conduct heat away from the material rapidly in order that the material may be cooled to a temperature below its softening point as soon as possible. If the heat transfer is rapid and the heat-softenable material is cooled to a temperature below its softening point quickly, either the rate of throughput of the heat-softenable sheet material passed through the apparatus may be increased or the length of the cooling zone may be reduced. Examples of materials suitable for use to provide belts in a belt arrangement according to the invention include glass fibre/KEVLAR (RTM) belts or steel mesh belts. Each of these may be covered with a coating of PTFE to reduce wear of the actual belt itself; the PTFE coating also provides a so-called 'non-stick' coating which will reduce any tendency for the heat-softenable material being processed to stick to the belts. Both of these materials are preferred for use in apparatus according to the invention as an endless belt may be produced using these materials which has only a very slight raised portion at the seam. This is important as a raised seam will affect the gauge control of the material passed through an apparatus according to the invention. The strength and other properties of such belts enable very thin belts to be used, providing excellent thermal performance and also allowing the bulk of the apparatus, and hence the cost, to be reduced as smaller guiding and drive rollers may be used than in conventional pressing apparatus using heavy steel belts which require large rollers around which to pass. A solid steel band may also be used but this is less preferred as it has a higher heat capacity and may also sag due to its weight.

The heated zone in apparatus according to the invention preferably comprises opposing heating plates arranged so that both sides of the heat-softenable material may be equally heated. It may, however, be desired to heat the plates unequally so that the smoothing, compressing and densifying effect achieved by compressing the material in its heat-softened state applies more to one side than the other. This can be used to control the surface finish of the material.

The material may be heated to bring it to a heat-softened condition from room temperature or alternatively, apparatus according to the invention may be so positioned that heat-softenable material passes immediately into the apparatus after leaving the final process stage of its production process. In this latter case, the material may well be at an elevated temperature (e.g. of the order of 140° C.) and so require only a very small amount of heat to bring it to a suitable heat-softened state ready for compressing. The passage through the heated zone may further comprise a tapering section comprising two opposing surfaces at least one of which is inclined to the central longitudinal axis passing between the surfaces whereby the material is compressed as it passes therethrough. Preferably both surfaces are inclined to each other so that the material is compressed equally on each side. The tapering section may be provided by an insulating section between the heated and cooling zones which compresses the material which is maintained in a heat-softened condition whilst in the insulating section. Preferably, however, the first pair of heated plates provide the tapering section. Conveniently the heated plates are arranged to taper continuously between the entry to the passage between said heated plates and the exit therefrom. Optionally, where the heated plates provide the tapering section of the passage, the heated zone may further comprise an additional pair of heated plates disposed in substantially parallel arrangement adjacent said first pair of heated plates. This additional pair of heated plates may be disposed after the first pair of heated plates and having parallel surfaces spaced at a distance apart equal to the intended thickness of the compressed, heat-softened the material. The passage of the compressed material in its heat-softened state through this additional pair of heated plates can add to the further control of the gauge of the final product. Alternatively or additionally, there may be a pre-heating section prior to the tapering section comprising parallel heating plates arranged to heat the heat-softenable material before it is passed between said first pair of heated plates. The softened material may exit from the heated zone at the desired thickness of the material. The material is maintained at this thickness whilst passing into the cooling section which is also set to the same gauge i.e. the desired thickness of the material. Alternatively, the softened material may exit from the heated zone at somewhat less than the desired thickness. This allows the material to recover slightly from its compressed state, which may release some internal pressure, but is not sufficient to allow any unevenness in the gauge in the final product, and, in many cases, the surface finish of the final product is improved.

The cooling zone comprises a substantially parallel pair of cooling plates which are arranged to reduce the temperature of the material below its softening point. Each belt of the belt arrangement bears against one of the cooling plates as it passes through the apparatus. The second pair of plates of the cooling zone are arranged to be substantially parallel and are rigidly located with a separation equal to the desired thickness of the material. The length of the cooling section must be sufficient to reduce the temperature of the heat-softenable material below its softening point throughout its entire thickness. When the temperature of the material is below its softening point, it does not recover to any significant extent from the thickness to which it has been set and is hence maintained at this preset gauge. The cooling zone may be arranged to cool the material to any desired temperature below its softening point. For example, it may be cooled substantially by using water as the cooling fluid so that it may be wound onto a roll for storage or it may be cooled only slightly (e.g. to 150° C.) to be at the same temperature as a material coming out of the final stage of its production process.

The belts of the belt arrangement are arranged to bear against the heating and cooling plates of the heating and cooling sections respectively to make the heating and cooling processes as efficient as possible. In order to reduce wear the belts and/or the plates may be coated with a wear resistant material, as hereinbefore mentioned.

A supply of air or other gas may be bled through said second pair of plates to provide an air or gas film in the cooling zone between each of said second pair of plates and the belt bearing against that plate. The energy required to forward the material through the cooling zone is thus considerably reduced.

A wide range of temperatures may be employed in the present invention. The operating temperatures are governed by the softening point of the material since it is desired to ensure that the entire body of heat-softenable material passing through the heated zone is heated to a temperature above its softening point and to ensure that the cooling zone is cooled to a temperature below the softening point of the sample. It is important to ensure that the heating and cooling processes heat and cool respectively the entire thickness of the material. Where non-woven material used in the manufacture of footwear, e.g. shoe lining material or insole material, is treated in apparatus according to the invention, temperatures in the range 180° C. to 240° C. are used, although they may be higher or lower as determined by the softening point of the materials desired to be gauged. The first pair of plates is heated by conventional heating methods to any particular desired temperature; preferably heat transfer oil is employed. The second pair of plates are cooled by conventional cooling methods, for example a cooling liquid e.g. water, to a predetermined temperature. The rate at which heat-softenable material may be processed by the invention may be varied as desired. The rate depends on the length of the heated and cooling zones; longer zones allow a faster throughput rate. The rate at which the material is processed in accordance with invention will also depend on the thickness of the material as the material must be heat-softened throughout its thickness. Material initially of a thickness greater than 10 mm will not normally be gauged to such an accurate degree as material of a smaller thickness, in the range 0.5 to 5 mm, for example.

Material processed in accordance with the invention may be given a specific surface appearance. This may be achieved by using belts themselves having a desired surface finish or by inserting an embossed material, for example release paper, between the belts and the heat-softenable material. As it passes through the heated zone, the surface of the heat-softened material is moulded corresponding to the embossed pattern.

DRAWINGS

Preferred embodiments of the invention will now be described in greater detail by way of example with reference to the accompanying drawing which is a diagrammatic side view of an illustrative apparatus.

The illustrative apparatus 10 comprised a heated zone 12 and a cooling zone 14 and a pair of endless belts 16,18. The heated zone 12 comprised two adjustable opposing heating platens 20,22, each having a heating surface 24,26 respectively. The passage between the heating surfaces 24,26 was arranged to taper from inlet 28 of the heated zone to outlet 30 thereof. The separation between the heating surfaces at inlet 28 was 1.2 mm and at outlet 30 was 0.6 mm. The cooling zone comprised two adjustable opposing cooling platens 32,34, each having a cooling surface 36,38 respectively. The cooling surfaces 36,38 were arranged to be parallel and were spaced at a distance of 0.6 mm apart. An insulating portion 25, comprising SYNDANIO (RTM) board, was located between the heated zone 12 and the cooling zone 14; it was set to provide a passage having the same gauge as the outlet 30 of the heating section 12 and was intended to ensure both that heat was not transferred between the heated zone 12 and the cooling zone 14 and that the material was not allowed to recover from the thickness which it reached at outlet 30. The endless belts 16,18 comprised TYGAFLOR (RTM) belts, which are made of glass fibre and KELVAR (RTM) with a PTFE coating. (Available from Fothergill & Harvey plc, Littleborough, Lancashire, England.) Belt 16 was passed around two guiding rollers 40,41 and a drive roller 42 and was arranged to bear against a tensioning roller 44. The path of the belt 16 was arranged so that the inside surface of the belt bore against heating surface 24 of heating platen 20 and against cooling surface 36 of cooling platen 32. Similarly, 18 passed around guiding rollers 46,47 and drive roller 48 and bore against tensioning roller 50. The path of belt 18 was arranged so that the inside surface of the belt bore against heating surface 26 and against cooling surface 38. Belts 16,18, because of their thickness, had a low heat capacity so that heat from heated zone 12 was quickly transferred to a sheet of material inserted between the belts 16,18 and rapidly removed from the sheet of material in the cooling zone.

Explanation of the Invention in detail

In the illustrative process, a sheet of impregnated non-woven shoe lining material 52 to be compressed to a thickness of 0.6 mm was interposed between the two belts 16,18 to be carried through the heated zone 12 and the cooling zone 14 of the illustrative apparatus at a rate of 2 meters per minute. Heating platens 20,22 measuring 0.4 m in length, 1.8 m in width and 0.075 m in thickness were used and were heated to a temperature of 220° C. using heat transfer oil. Cooling platens 34,32 measuring 0.2 in length, 1.8 m in width and 0.075 m in thickness were used and were kept at a temperature of 15° C. using water as the cooling liquid. Whilst in the heated zone heat was transferred through belts 16,18 from the heating platens 20,22 to the sheet 52 of material to bring the sheet to a heat-softened condition throughout its thickness. As it passed through the heated zone its thickness was reduced by the tapering heating surfaces 24,26 until it reached the final desired thickness (0.6 mm) at outlet 30. It was maintained at this thickness whilst being passed through insulating portion 25 and between cooling platens 32,34 of the cooling zone 14. Heat was removed from the sheet whilst it was in the cooling section so that the temperature of sheet 52 was reduced to a temperature below its softening point.

When pressed sheet 52 emerged from the cooling zone it was sufficiently cool to enable it to be wound on to rollers for storing.

The following six examples show typical results in the variation in gauge (thickness) of samples of impregnated, non-woven, heat-softenable sheet material before and after treatment by the process and apparatus of the invention.

In each case, the example sheet material, having thermoplastic behaviour, basically comprised an impregnated, non-woven, polyester felt comprising a carboxylated styrene-butadiene latex, together with other materials such as pigments, fillers etc. The samples did, however, have various differences; for example, the material in example 1 was additionally non-absorbent, the material in example 2 was water absorbent and the material of Example 6 was such a non-woven, polyester material laminated with a non-woven batt of polyester/polypropylene fibres and a nitrile rubber/PVC bonding agent.

Method of assessment

For testing, each sheet was divided into a number of sections, preferably 16, with each section identified as shown in the plan below.

| 1 | 2 | 3 | 4 |
|---|---|---|---|
| 5 | 6 | 7 | 8 |
| 9 | 10 | 11 | 12 |
| 13 | 14 | 15 | 16 |

Measurements of the width, length and density of the sample of material were taken, together with measurements of the gap between the cooling surfaces of the cooling platens, the rate at which the material was passed through the illustrative apparatus and the temperatures of the heating and cooling surfaces. The thickness of each of the example sheet materials was measured at the centre of each of sections 1 to 16 of the above plan (Examples 1-5) or 1 to 12 (Example 6) to plot the variation in thickness of each sheet. Parallel series of measurements were taken of each Example before and after processing by the apparatus. From the results the Coefficient of Variation in thickness of the material was determined. The Coefficient of Variation was calculated from the standard deviation of these results and the mean gauge (thickness) of the material. This gives a guide to the variation in thickness across each sample of the material.

The results of all the measurements taken are shown in Tables 1 to 6.

Tables 1(a), 2(a), 3(a), 4(a), 5(a) and 6(a) show the physical measurements of the example sheet materials before pressing and Tables 1(b), 2(b), 3(b), 4(b), 5(b) and 6(b) show the measurements after pressing in the illustrative apparatus. As can be seen from the Tables following hereafter, the Coefficient of Variation of the thickness of the material processed according to the invention is significantly improved compared with that of the unprocessed material. Usually, material processed in accordance with the invention has a Coefficient of Variation of not more than 1.5, preferably less than 1.0. It can also be seen that the final thickness of the material closely corresponds with the distance set between the cooling surfaces of the cooling platens.

EXAMPLE 1

TABLE 1

| SETTINGS | |
|---|---|
| PLATEN GAP | 2.16 mm |
| PLATEN TEMP. (HOT) | 223° C. |
| PLATEN TEMP. (COLD) | 15° C. |
| SPEED | 2 m/min |

| Before Pressing | | | |
|---|---|---|---|
| 2.35 | 2.32 | 2.31 | 2.39 |
| 2.33 | 2.30 | 2.30 | 2.37 |
| 2.30 | 2.29 | 2.31 | 2.46 |
| 2.28 | 2.26 | 2.24 | 2.31 |
| Width 1000 mm | | Length 1000 mm | |

| | |
|---|---|
| Maximum thickness (gauge) | 2.46 mm |
| Minimum thickness (gauge) | 2.24 mm |
| Mean gauge (thickness) | 2.32 mm |
| Standard deviation | 5.1 |
| Coef. of Var % is | 2.2 |
| Density | 0.34 g/cm$^3$ |

| After Pressing | | | |
|---|---|---|---|
| 2.12 | 2.11 | 2.10 | 2.09 |
| 2.13 | 2.14 | 2.12 | 2.12 |
| 2.12 | 2.14 | 2.13 | 2.13 |
| 2.11 | 2.11 | 2.09 | 2.09 |
| Width 998 mm | | Length 999 mm | |

| | |
|---|---|
| Maximum thickness (gauge) | 2.14 mm |
| Minimum thickness | 2.09 mm |
| Mean gauge (thickness) | 2.12 mm |
| Standard deviation | 1.6 |

TABLE 1-continued

| | |
|---|---|
| Coef. of Var % is | 0.8 |
| Density | 0.38 g/cm³ |

EXAMPLE 2

TABLE 2

| SETTINGS | |
|---|---|
| PLATEN GAP | 2.50 mm |
| PLATEN TEMP. (HOT) | 212° C. |
| PLATEN TEMP. (COLD) | —° C. |
| SPEED | 1 m/min |

Before Pressing

| | | | |
|---|---|---|---|
| 3.06 | 2.97 | 3.07 | 3.01 |
| 3.06 | 2.93 | 3.03 | 3.06 |
| 3.08 | 2.93 | 3.07 | 3.04 |
| 3.10 | 2.97 | 3.11 | 3.02 |
| Width 1496 mm | | Length 1220 mm | |

| | |
|---|---|
| Maximum thickness | 3.11 mm |
| Minimum thickness | 2.93 mm |
| Mean gauge (thickness) | 3.03 mm |
| Standard deviation | 5.4 |
| Coef. of Var % is | 1.8 |
| Density | 0.37 g/cm³ |

After Pressing

| | | | |
|---|---|---|---|
| 2.60 | 2.62 | 2.60 | 2.58 |
| 2.60 | 2.60 | 2.59 | 2.57 |
| 2.60 | 2.59 | 2.58 | 2.56 |
| 2.59 | 2.58 | 2.56 | 2.54 |
| Width 1488 mm | | Length 1203 mm | |

| | |
|---|---|
| Maximum thickness | 2.62 mm |
| Minimum thickness | 2.54 mm |
| Mean gauge (thickness) | 2.59 mm |
| Standard deviation | 1.9 |
| Coef. of Var % is | 0.7 |
| Density | 0.43 g/cm³ |

EXAMPLE 3

TABLE 3

| SETTINGS | |
|---|---|
| PLATEN GAP | 2.75 mm |
| PLATEN TEMP. (HOT) | 223° C. |
| PLATEN TEMP. (COLD) | 15° C. |
| SPEED | 1 m/min |

Before Pressing

| | | | |
|---|---|---|---|
| 2.92 | 2.90 | 2.96 | 2.87 |
| 3.03 | 2.95 | 2.97 | 2.85 |
| 2.92 | 2.94 | 2.96 | 2.90 |
| 3.07 | 3.06 | 2.97 | 2.95 |
| Width 1530 mm | | Length 1228 mm | |

| | |
|---|---|
| Maximum thickness | 3.07 mm |
| Minimum thickness | 2.85 mm |
| Mean gauge | 2.95 mm |
| Standard deviation | 6.2 |
| Coef. of Var % is | 2.1 |
| Density | 0.51 g/cm³ |

After pressing

| | | | |
|---|---|---|---|
| 2.73 | 2.71 | 2.73 | 2.72 |
| 2.74 | 2.73 | 2.72 | 2.71 |
| 2.71 | 2.73 | 2.72 | 2.73 |
| 2.74 | 2.74 | 2.72 | 2.72 |
| Width 1526 mm | | Length 1222 mm | |

| | |
|---|---|
| Maximum thickness | 2.74 mm |
| Minimum thickness | 2.71 mm |
| Mean gauge | 2.73 mm |
| Standard deviation | 1 |

TABLE 3-continued

| | |
|---|---|
| Coef. of Var % is | 0.4 |
| Density | 0.56 g/cm³ |

EXAMPLE 4

TABLE 4

| SETTINGS | |
|---|---|
| PLATEN GAP | 3.25 mm |
| PLATEN TEMP. (HOT) | 223° C. |
| PLATEN TEMP. (COLD) | 15° C. |
| SPEED | 1 m/min |

Before Pressing

| | | | |
|---|---|---|---|
| 3.47 | 3.53 | 3.56 | 3.59 |
| 3.45 | 3.43 | 3.51 | 3.61 |
| 3.45 | 3.49 | 3.56 | 3.59 |
| 3.43 | 3.38 | 3.47 | 3.56 |
| Width 1000 mm | | Length 1000 mm | |

| | |
|---|---|
| Maximum thickness | 3.61 mm |
| Minimum thickness | 3.38 mm |
| Mean gauge | 3.51 mm |
| Standard deviation | 6.7 |
| Coef. of Var % is | 1.9 |
| Density | 0.41 g/cm³ |

After Pressing

| | | | |
|---|---|---|---|
| 3.27 | 3.28 | 3.27 | 3.26 |
| 3.26 | 3.27 | 3.25 | 3.23 |
| 3.25 | 3.25 | 3.25 | 3.24 |
| 3.25 | 2.32 | 3.22 | 3.22 |
| Width 999 mm | | Length 993 mm | |

| | |
|---|---|
| Maximum thickness | 3.28 mm |
| Minimum thickness | 3.22 mm |
| Mean gauge | 3.25 mm |
| Standard Deviation is | 1.8 |
| Coef. of Var % is | 0.5 |
| Density | 0.44 g/cm³ |

EXAMPLE 5

TABLE 5

| SETTINGS | |
|---|---|
| PLATEN GAP | 1.46 mm |
| PLATEN TEMP. (HOT) | 128° C. |
| PLATEN TEMP. (COLD) | 15° C. |
| SPEED | 2 m/min |

Before Pressing

| | | | |
|---|---|---|---|
| 164 | 157 | 159 | 159 |
| 154 | 150 | 153 | 153 |
| 160 | 156 | 158 | 156 |
| 168 | 169 | 175 | 175 |
| Width 1000 mm | | Length 1000 mm | |

| | |
|---|---|
| Maximum thickness | 1.75 mm |
| Minimum thickness | 1.50 mm |
| Mean gauge | 1.60 mm |
| Standard deviation | 7.5 |
| Coef. of Var % is | 4.6 |
| Density | 0.45 g/cm³ |

After Pressing

| | | | |
|---|---|---|---|
| 129 | 128 | 130 | 129 |
| 127 | 126 | 128 | 128 |
| 128 | 127 | 128 | 128 |
| 130 | 130 | 131 | 132 |
| Width 1000 mm | | Length 1000 mm | |

| | |
|---|---|
| Maximum thickness | 1.32 mm |
| Minimum thickness | 1.26 mm |
| Mean gauge | 1.29 mm |
| Standard deviation | 1.5 |

TABLE 5-continued

| | |
|---|---|
| Coef. of Var % is | 1.2 |
| Density | 0.55 g/cm$^3$ |

EXAMPLE 6

TABLE 6

| SETTINGS | |
|---|---|
| PLATEN GAP | 1.75 mm |
| PLATEN TEMP. (HOT) | 102° C. |
| PLATEN TEMP. (COLD) | 15° C. |
| SPEED | 1.5 m/min |

| Before Pressing | | | |
|---|---|---|---|
| 197 | 200 | 205 | 199 |
| 189 | 194 | 190 | 187 |
| 190 | 205 | 203 | 190 |
| Width 1000 mm | | Length 456 mm | |

| | |
|---|---|
| Maximum thickness | 2.05 mm |
| Minimum thickness | 1.87 mm |
| Mean gauge | 1.96 mm |
| Standard deviation | 6.3 |
| Coef. of Var % is | 3.2 |

| After Pressing | | | |
|---|---|---|---|
| 167 | 169 | 170 | 166 |
| 166 | 168 | 169 | 166 |
| 165 | 169 | 171 | 168 |
| Width 1000 mm | | Length 456 mm | |

| | |
|---|---|
| Maximum thickness | 1.71 mm |
| Minimum thickness | 1.65 mm |
| Mean gauge | 1.68 mm |
| Standard deviation | 1.8 |
| Coef. of Var % is | 1.1 |

We claim:

1. A process for precision controlling the thickness of a sheet of a compressable, heat-softenable material which comprises:
    a. heating the material equally on both sides to bring it to a heat-softened condition;
    b. compressing the material while in the heat-softened condition to a thickness less than the desired thickness; and
    c. expanding the material to the desired thickness while cooling the material equally on both sides to below its softening point by passing it between parallel cooling plates spaced apart by the desired thickness.

2. The process of claim 1 wherein the material is advanced by a pair of endless belts.

3. The process of claim 2 wherein said belts are coated with a non-stick PTFE coating.

4. The process of claim 2 wherein said belts are provided with a surface pattern to be imparted to the material.

5. The process of claim 2 wherein an embossed material having a surface pattern to be imparted to the material is inserted between said belts and the material.

6. The process of claim 5 wherein said embossed material comprises release paper.

7. The process of claim 1 wherein said cooling plates are cooled by a cooling fluid.

8. The process of claim 7 wherein gas is bled through said cooling plates.

9. The process of claim 1 wherein said heating is to a temperature in the range of 180° C. to 250° C.

10. The process of claim 1 wherein after compression, the material passes through an insulation section in which the material is maintained in its compressed heat-softened state.

* * * * *